Oct. 13, 1970

FRIEDRICH-WILHELM KUCHENHART ET AL 3,533,310

METHOD OF MAKING FILES

Filed Feb. 2, 1968

INVENTORS

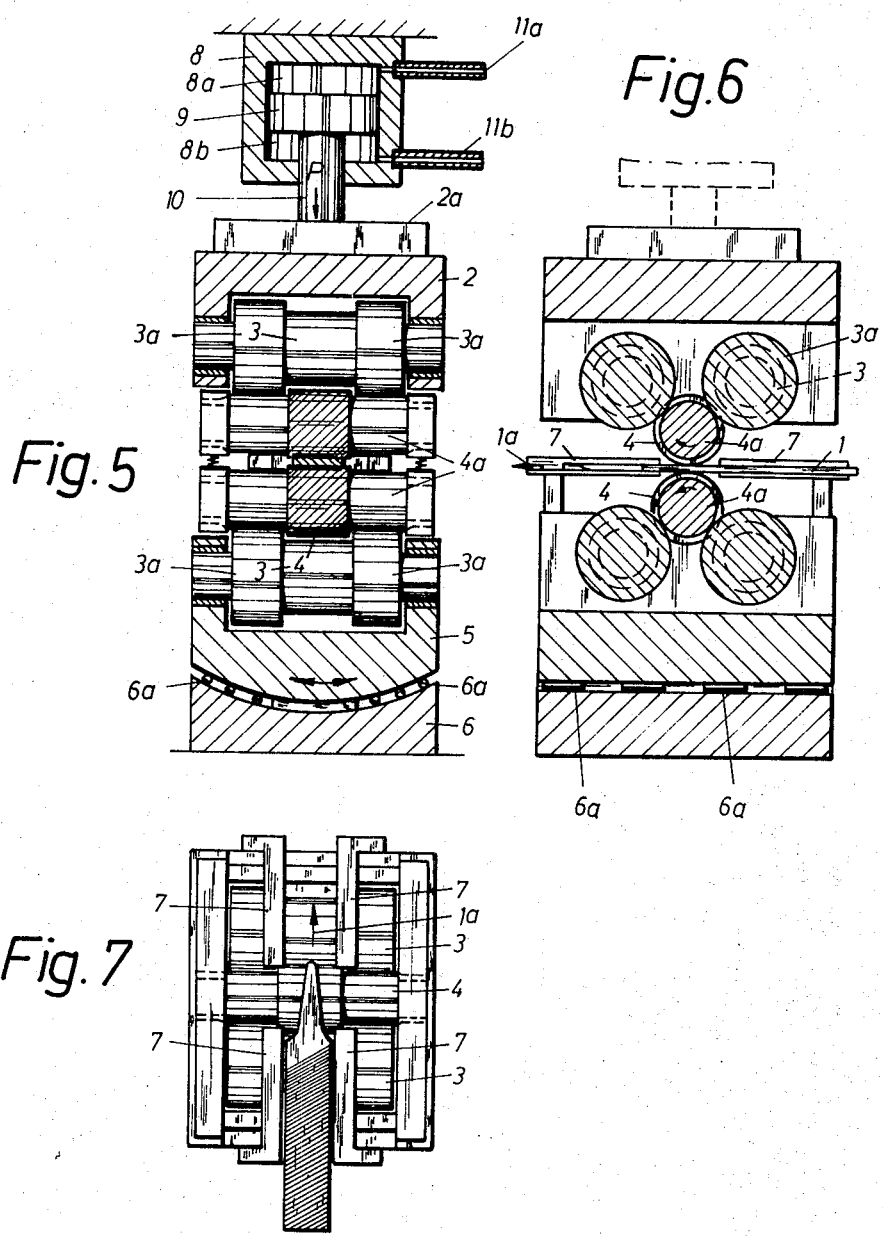

United States Patent Office 3,533,310
Patented Oct. 13, 1970

3,533,310
METHOD OF MAKING FILES
Friedrich-Wilhelm Kuchenhart, Neuss (Rhine), Josef Kürbig, Dusseldorf, and Dieter Langer, Buderich, Germany, assignors to Rohde & Dorrenberg, Dusseldorf-Oberkassel, Germany, a corporation of Germany
Continuation-in-part of application Ser. No. 675,005, Sept. 26, 1967. This application Feb. 2, 1968, Ser. No. 702,624
Int. Cl. B23d 73/04
U.S. Cl. 76—24                                  1 Claim

ABSTRACT OF THE DISCLOSURE

A method of producing files of a file blank, which comprises the steps of performing first an upper cut on the faces of the file blank to form edges, and pressing then a lower cut on the faces to form notches transversely across the edges already thrown by the upper cut. The notches are adapted to perform the function of the lower cut in breaking up filings.

---

This application is a continuation-in-part of our patent application, Ser. No. 675,005, filed Sept. 26, 1967.

The present invention relates to a method of, tool and apparatus for the manufacture of files.

In file making, the conventional method of producing cutting teeth is to form on the working faces of the files, in two successive operations, what are known as cuts, each operation producing cuts at a particular angle to the longitudinal direction of the file, at which angles the cuts intersect.

During the file-making process, whereas rows of sharp-edged teeth capable of cutting are produced by the so-called upper cut, during the under cut notches are formed which cross the upper cut and are intended primarily to break up the filings.

It is apparent that the notches for these filing-breakers, which do not need production with the same sharp-edge as the upper cut, may well be produced on the working face of the file by some means other than cutting.

There are already known methods in which, instead of working by cuts, notches are made by a rolling process, while the upper cuts are formed in conventional manner. One drawback of these processes is that the rolling or pressing operation, which must be carried out cold because of the fineness of the shaping, involves such large shaping forces, that upon completion of the pressing, the file body has not only notches stamped into the body of the file, but the body as a whole is considerably altered in its total cross-section.

Moreover, the depth of the lower cut notches obtainable by pressing is so small, that they are largely re-closed during the subsequent upper cut and thus become almost non-effective for breaking up the filings.

Another disadvantage is the short life of the finely cut pressing tools, the tooth profiles of which are exposed to the severe shaping stresses. The necessarily asymmetrical form of the fine teeth of the pressing tool also has an adverse effect on the life of the latter.

It is one object of the present invention, to provide a method of, a pressing tool and an apparatus for file making, with which it is possible to apply the "lower cut" without causing deformation of the file blank and without damaging the "lower-cut" notches during the "upper cut." In addition, it is intended to extend the life of the pressing tool.

It is another object of the present invention to provide a method of, tool and apparatus for the manufacture of files, wherein by virtue of the fact that the combination of the cutting method with the pressing or rolling process is carried out such, that first the so-called "upper" cut is performed, and thereafter in a following working step with rolling or pressing tools, notches are formed transversely across the edges already thrown up by the "upper" cut, which notches perform the function of the filing-breaking "lower" cut.

In addition to the considerable economic gain to be achieved by this process, it also has the following advantage: In the conventional method, the action of the upper-cut chisel produces a cut having both faces plane, one of which, constituting the shaving face of the file tooth, has an unfavorable negative shaving angle of up to 15°.

As regards the cutting capability of a file, what is required is not a scraping action, which is what results when the file teeth have a negative shaving angle, but the formation of non-objectionable shavings, which is possible only with positive shaving angles, such as are produced by the method of the present invention.

In its practical execution, the angles of the flanks on the notching teeth may be formed either symmetrical or asymmetrical. To enable the tooth flanks to bite as deeply as possible into the ridges already thrown up by the "upper" cut and therefore to throw up edges directed predominantly sideways at the shaving face of the "upper" cut, the tooth flanks are made acute-angled. To ensure that the tooth flanks shall bite less deeply into the ridges already thrown up by the "upper" cut, so that the edges thereby produced shall be directed predominantly inwards and thus produce a positive tooth angle on a part of the tooth length of the "upper" cuts, the tooth flanks are formed obtuse-angled.

In the apparatus for performing the method of the present invention, using a pressing tool conforming to the invention, one or both of the pressing rolls are mounted pivotally to provide compensation for any lack of parallelism in the file blank. In this apparatus, the center for the swinging movement of the roller mounting is situated such, that the line in which the pressing forces act passes through the center. The file blanks are guided through the pressing rollers, during passage in front of and/or beyond the rollers, by lateral guides.

In one practical embodiment of the present invention, the pressing rolls are designed to present cylindrical pins at both ends, and support themselves between running faces of increased diameter on large backing-up rolls for transmission of the pressing forces. The power required for pressing is kept constant by a pressure medium irrespective of variations in the thickness of the file blanks. To enable compensation to be provided for variations in width, that of file blanks which vary in width (tapered flat files, for example) can be sensed from both sides, whereby the power required for pressing can be adjusted as required, by a system of levers, according to the width of the file blank encountered from moment to moment.

With these and other objects in view which will become apparent in the following detailed description, the present invention will be clearly understood in connection with the accompanying drawings, in which:

FIG. 5 is a front elevation, partly in section, of the apparatus used for performing the method of the present invention;

FIG. 6 is a side elevation, partly in section, of the apparatus disclosed in FIG. 5;

FIG. 7 is a top plan view of the lower half of the apparatus; and

Figure 1:
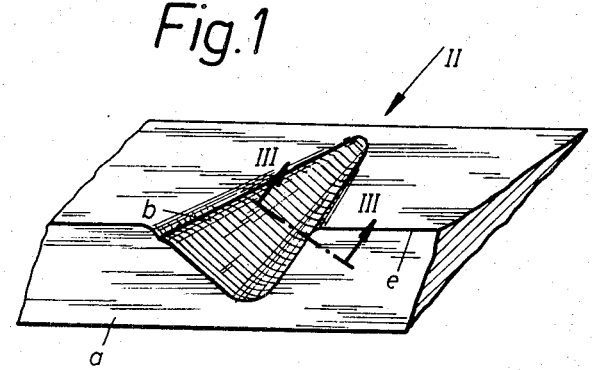
FIG. 1 is a perspective top view of a part of an "upper-cut" file tooth.
Figure 2:
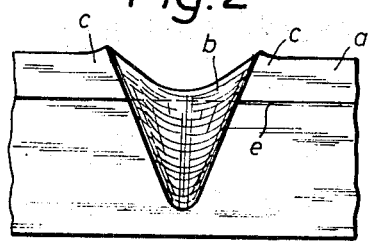
FIG. 2 is a view of a part of the file as it appears to an observer looking in the direction of the arrow II in FIG. 1.
Figure 3:
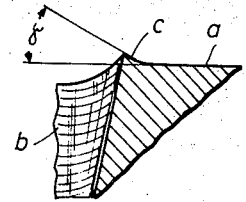
FIG. 3 is a section of an "upper-cut" file tooth, at right angles to the shaving face, along the lines III—III of FIG. 1.
Figure 4:
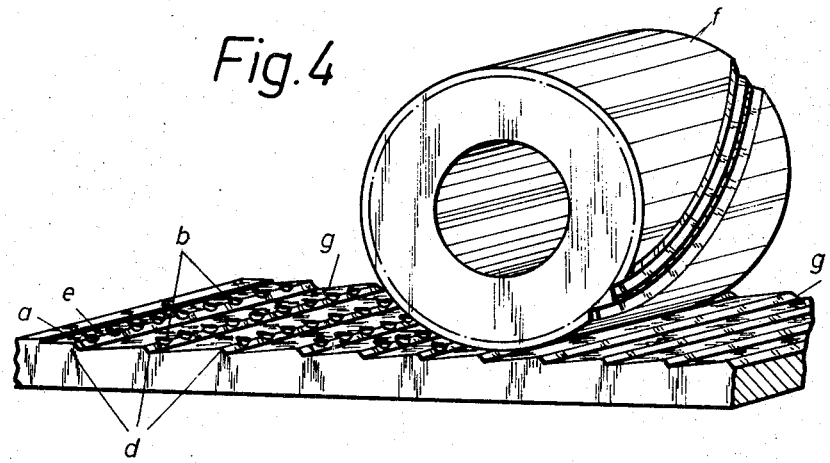
FIG. 4 is a perspective view of a pressing tool pressing the "lower-cut" notches into a file blank that has already received its "upper-cut"

Referring now to the drawings, in the process of the present invention, the pressing stage resides in applying the relatively obtuse-angled tooth flanks of the pressing tool $f$ (FIG. 4) to the negatively angled shaving face $a$ of the file tooth $d$, at a right angle to the cut $g$ already made, in such manner as to produce a multiplicity of notches $b$, each of which has two scoop-shaped raised cutting edges $c$ with positive shaving angle (FIG. 3). These pairs of raised cutting edges $c$ are pressed out of the edge $e$ of the "upper cut" towards right and left, so as to stand apart of its shaving face $a$ and thus present a cross-cut-like arrangement of cutting edges, which promotes the escape of the filings.

In carrying out the method in accordance with the present invention, the combination of the cutting and pressing operations is such, that teeth corresponding to the so-called "upper" cut, as regards the direction and angle of the cutting edges, are cut first, after which in a following working step by rolling or pressing tools, notches are applied transversely across the ridges thrown up by the previously applied "upper" cut, which notches take over the function of the "lower" cut in breaking up the filings.

In the practical embodiment of an apparatus for performing the method of the present invention, illustrated in FIGS. 5, 6, and 7, a file blank 1 to be worked is fed through between pressing rolls 4 in the direction of the arrow 1a. The power P required for pressing is transmitted from the upper half 2 of a rolling stand by backing-up rolls 3 and thus by pressure rolls 4, which apply the pressure to the file blank 1. The symmetrical design of the upper and lower halves 2 and 5 of the rolling stand enables the desired shaping or profile to be applied simultaneously to both sides of the file blank 1 during a single passing.

For compensation of variations in the thickness of the file blank 1, the lower half 5 of the stand is mounted on a base 6 by means of rollers 6a, which permit a pendulum movement or pivotal movement. During the rolling process, the file blank 1 is guided on both sides in the direction of travel, in front of and behind the pressing rolls 4, by guide strips 7. The pressing rolls 4 have cylindrical running faces 4a of reduced diameter near each end, by which the rolls bear, for transmission of the pressing forces between running faces 3a of increased diameter of the large dimensioned backing-up rolls 3. The power required for pressing is kept constant by a pressure medium irrespective of variations in the thickness of the file blank 1. For this purpose on the upper side 2a of the upper half 2 of a rolling stand a piston rod 10 of a piston 9 is secured, which piston 9 is reciprocating in a hydraulic pressure cylinder 8. The piston 9 divides the cylindrical chamber of the hydraulic pressure cylinder 8 into an upper piston-side pressure chamber 8a and a lower piston rod-side pressure chamber 8b, which chambers 8a and 8b communicate each with a pressure medium conduit 11a and 11b, respectively. Depending upon the feeding of more or less of the pressure medium through the conduits 11a and 11b into the upper or the lower pressure chamber 8a and 8b, respectively, the pressure force P (FIG. 5) can be maintained constant.

Figure 8:
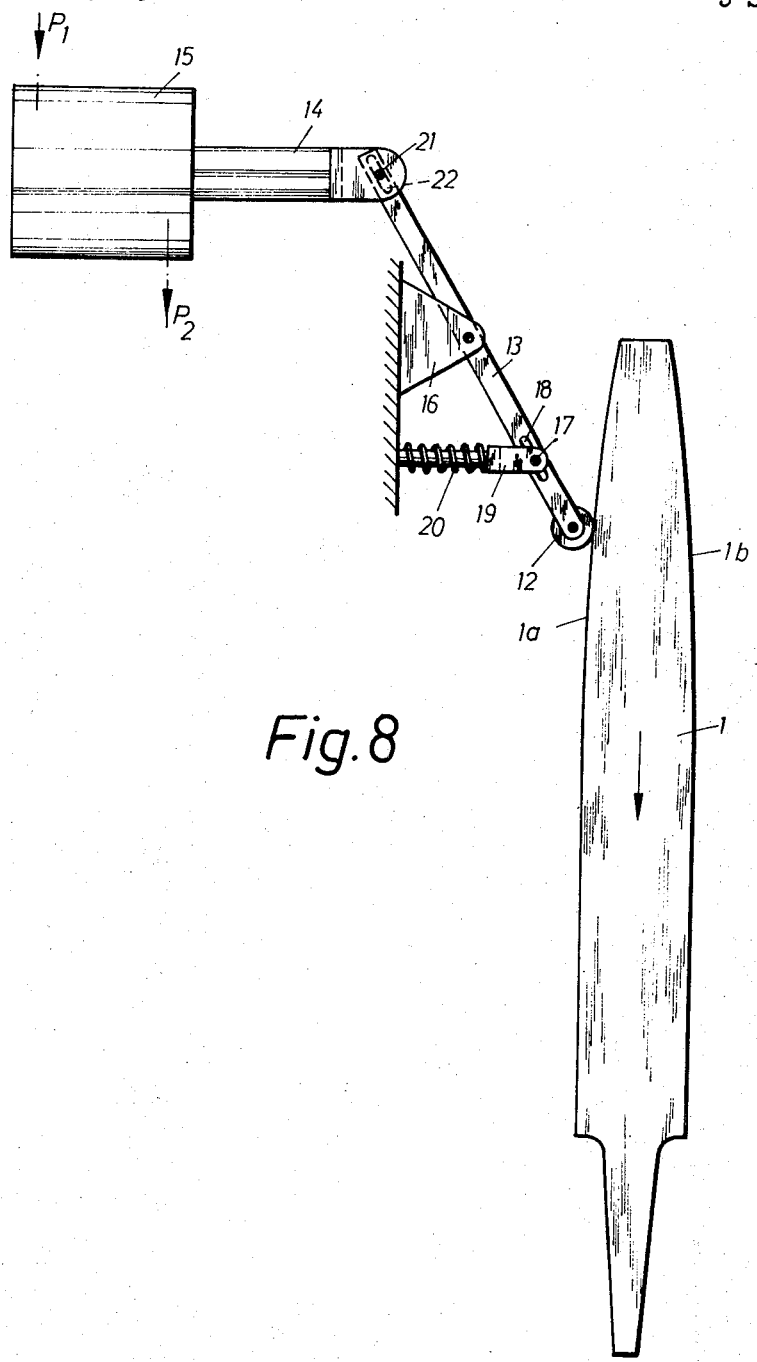
FIG. 8 is an elevation of an apparatus for sensing the width of a file blank.

During the manufacture of file bodies with non-equal width, for instance, tapered flat files, one such file being disclosed in FIG. 8, the width of the file blank 1 is sensed during its passage through the pressure rolls 4 from both sides by means of a sensing roller and the result is transmitted by means of a lever 13 to a setting rod 14 of a hydraulic pressure control valve 15. By means of this valve 15 the pressure force P effective by the pressure means device 8 to 11, in response to the prevailing sensed width of the passing work piece 1, is hydraulically controlled. The lever 13 is swingably mounted in a solidly disposed support 16 and operatively connected with a spring 20 by means of a bolt 17, movable in a longitudinal slot 18 of the lever 13, and by means of a pressure member 19, which presses always the sensing roller 12 to the side edges 1a of the work piece 1. The lever 13 is likewise movably connected with the setting rod 14 by means of a bolt 21 and a slot 22. It is to be understood that the other side edge 1b of the file blank 1 can be sensed with a similar device 12 to 20.

While we have disclosed one embodiment of the present invention it is to be understood that this embodiment is given by example only and not in a limiting sense, the scope of the present invention being determined by the objects and the claim.

We claim:

1. A method of production of files of a file blank comprising the steps of
    performing first an upper cut on the faces of said file blank to form edges, and
    pressing then a lower cut on said faces to form notches transversely across said edges already thrown by said upper cut, said notches being adapted to perform the function of said lower cut in breaking up filings.

References Cited

UNITED STATES PATENTS

| 2,068,622 | 1/1937 | Ufer | 76—24 |
| 2,897,692 | 8/1959 | Beckner et al. | 76—24 |

BERNARD STICKNEY, Primary Examiner

U.S. Cl. X.R.

29—78; 72—324